United States Patent [19]

Mori

[11] Patent Number: 4,771,371
[45] Date of Patent: Sep. 13, 1988

[54] LIGHT RAY RADIATING DEVICE

[76] Inventor: Kei Mori, 3-16-3-501, Kaminoge, Setagaya-ku, Tokyo, Japan

[21] Appl. No.: 70,483

[22] Filed: Jul. 7, 1987

[30] Foreign Application Priority Data

Jul. 10, 1986 [JP] Japan .................................. 61-162377

[51] Int. Cl.$^4$ ................................................ F21V 9/00
[52] U.S. Cl. ..................................... 362/293; 362/31; 362/32; 362/268; 47/17
[58] Field of Search ...................... 362/293, 1, 805, 32, 362/34, 2, 31, 19, 293, 222, 257, 268; 354/227.1; 350/335, 336; 47/17; 358/168

[56] References Cited

U.S. PATENT DOCUMENTS

| | | | |
|---|---|---|---|
| 2,705,903 | 4/1955 | Marshall | 354/227.1 |
| 2,960,914 | 11/1960 | Rogers | 354/227.1 |
| 3,397,023 | 8/1968 | Land | 354/227.1 |
| 3,890,628 | 6/1975 | Gurtler | 350/335 |
| 4,066,335 | 1/1978 | Courtney et al. | 354/227.1 |
| 4,622,584 | 11/1986 | Nagasaki et al. | 358/168 |
| 4,636,817 | 1/1987 | Masaki | 350/336 |
| 4,639,089 | 1/1987 | Okada et al. | 350/341 |

OTHER PUBLICATIONS

Edmund Scientific Catalog, 1987, p. 25, "Liquid Crystal Light Shutter".

Primary Examiner—Raymond A. Nelli
Attorney, Agent, or Firm—Jordan and Hamburg

[57] ABSTRACT

A light ray radiating device for effectively dispersing light ray energy emitted from an optical conductor cable into a direct-light ray component and into an indirect-light ray component in order to cultivate plants more effectively. The device comprises an upper plate having a hole through which the light-emitting end of an optical conductor cable is inserted at the approximate central portion of the upper plate, a lower plate composed of a light diffusing and reflecting liquid-crystal plate is disposed so as to be opposed to the light-emitting end of the optical conductor cable, a frame body for unitarily mounting thereon the upper plate and the lower plate, and an intermediate plate having a light ray passing portion at the central part thereof and mounted on the frame body between the upper plate and the lower plate. The light ray energy passing through the lower plate composed of the liquid-crystal plate is controlled by changing the voltage applied thereto.

16 Claims, 1 Drawing Sheet

U.S. Patent     Sep. 13, 1988     4,771,371

LIGHT RAY RADIATING DEVICE

BACKGROUND OF THE INVENTION

The present invention relates to a light ray radiating device, in particular a light ray radiating device for effectively dispersing light ray energy emitted from an optical conductor cable into a direct-light ray component and into an indirect-light ray component in order to cultivate plants more effectively and when using light ray energy transmitted through an optical conductor cable to activate the photo-synthesis process.

In order to effectively cultivate plants, a proper amount of nutritious substances, light rays, carbon dioxide, water, humidity, etc. is needed. However, it is difficult to provide all of them in the right amounts. and furthermore the cultivation of plants requires the earth as a foundation to be employed as a mother-body for cultivating plants.

However, in urban areas, such as in a megalopolis, it is not easy to acquire space for cultivation. Especially, it is very difficult to secure soil in the sun required for the cultivation of plants. In order to solve such a problem, the present applicant has previously proposed focusing solar rays by the use of a lense or the like, to guide them into an optical conductor cable, and to further guide the same through the optical conductor cable onto a plant cultivating device installed in an optical, desired place for the purpose of supplying solar ray energy to plants. The present applicant has further proposed another plant cultivating device in which artificial light rays were utilized in addition to solar rays collected as described above. (For instance, refer to the U.S. Pat. No.; 4,653,223.)

In order to effectively cultivate plants, direct solar rays and indirect solar rays are needed. Conventionally and previously a light source device capable of effectively radiating onto plants such direct solar rays and indirect solar rays had not been proposed.

SUMMARY OF THE INVENTION

It is an object of the present invention to provide a light ray radiating device capable of effectively radiating onto plants direct solar rays and indirect solar rays.

It is another object of the present invention to provide a light ray radiating device, the ratio of direct light rays and indirect light rays can be selected optionally to a desired value for supplying both types of light rays to plants, and thereby the plants can be more and more effectively cultivated.

The above-mentioned features and other advantages of the present invention will be apparent from the following detailed description which goes with the accompanying drawings.

DESCRIPTION OF THE PREFERRED EMBODIMENTS

Figure 1:
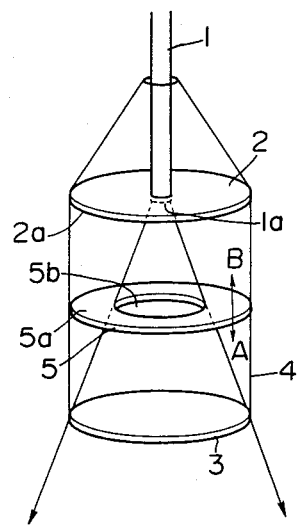
FIG. 1 is a construction view for explaining an embodiment of the present invention.

FIG. 1 is a construction view for explaining the embodiment of a light ray radiating device according to the present invention. In FIG. 1, 1 is an optical conductor cable through which the light ray energy is transmitted, 2 an upper plate having a hole through which the light-emitting end 1a of the optical conductor cable 1 is inserted at the approximate central portion of the upper plate, 3 a light diffusing and reflecting type liquid-crystal plate (a lower plate) disposed so as to be opposed to the light-emitting end 1a of the optical conductor cable 1, 4 a frame body for unitarily assembling the upper late 2 and the lower plate 3, and 5 an intermediate plate capable of moving in the direction shown by an arrow marked A or B in the frame body 4 between the upper plate 2 and the lower plate 3 and having a central portion capable of passing light rays therethrough. The circumferential portion 5a of the intermediate plate 5 is constructed of a mirror plate or a light diffusing and reflecting liquid-crystal plate.

Figure 2:
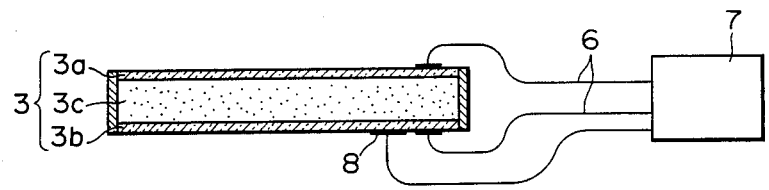
FIG. 2 is a cross-sectional view for explaining the details of the light diffusing and reflecting type liquid-crystal plate shown in FIG. 1.

FIG. 2 is a cross-sectional view for explaining an embodiment of the light diffusing and reflecting type liquid-crystal plate 3. The liquid-crystal plate 3 comprises an upper transparent electrode plate 3a, a lower transparent electrode plate 3b, and diffusing and reflecting liquid crystal 3c hermetically sealed between the electrode plates 3a and 3b. When the voltage is not applied thereto across the electrodes 3a and 3b, the liquid crystal 3c is transparent. On the contrary, when voltage, for instance 10 volts V, is applied thereto across electrodes 3a and 3b, the liquid crystal 3c becomes a light diffusing and reflecting plate.

In FIG. 2, 6 represents lead wires for applying voltage to electrodes 3a and 3b, and 7 is a power supply device. A switch for turning on and turning off the voltage of the power supply or a variable resistor for continuously changing the power supply voltage, or a step switch for changing the same step-wise is installed on the power supply device 7.

By turning the switch on and off, the light diffusing and reflecting liquid-crystal plate 3 becomes a light diffusing and reflecting plate or a transparent plate, and consequently direct light rays or indirect light rays can be alternatively focused onto an optional desired place. And further, it may be possible to continuously change the ratio of the direct light ray components and the indirect light ray components by using adjustable volume (a variable resistor), or else to change step-wise the ratio of the same two components by the use of a step switch.

The central portion 5b of the intermediate plate 5 is hollow and constructed of a transparent plate. Among the light rays radiated from the optical conductor cable 1, only the light rays passing through the hollow portion or the transparent portion 5b arrive at the light diffusing and reflecting type liquid-crystal plate 3 situated at the bottom of the device. On that occasion, when the light rays pass directly through the lower liquid-crystal plate 3 the same are radiated as direct light rays onto a desired place, and when the voltage is applied to the lower liquid crystal plate 3 the light rays are divided into direct light rays and indirect light rays depending on the amount of voltage applied thereto and the light rays are radiated onto a desired place. In the case that the circumferential portion 5a of the intermediate plate 5 is formed in the form of a reflecting plate, when the intermediate plate 5 is moved downwards in the direction shown by arrow A, the direct light ray components, passing through the lower plate 3, decrease, and the light rays reflected onto the reflecting plate portion 5a are radiated as indirect light rays. On that occasion, in order to effectively employ the light rays reflected onto the reflecting plate portion 5a as indirect light rays, the lower surface 2a of the upper plate 2 is formed in the state of a light reflecting surface and the frame body 4 is made of a semi-transparent substance. In such a construction, the light rays reflected on the reflecting light surfaces 5a and 2a are effectively dispersed by those semi-transparent bodies, and therefore the indirect light rays can be effectively radiated.

Furthermore, in case the circumferential portion 5a of the doughnut-like intermediate plate 5 is constructed of a light diffusing and reflecting liquid-crystal plate, the liquid-crystal plate portion 5a becomes a transparent body or a reflecting body as mentioned in connection with FIG. 2, and thereby the light rays can be divided into direct light rays and indirect light rays and radiated more and more effectively.

And further, in FIG. 2, 8 is a light sensor. The intensity of light rays passing through the lower light diffusing and reflecting liquid-crystal plate 3 is detected by the light sensor 8. The voltage applied to the lower diffused reflecting type liquid crystal plate 3 is changed in accordance with the detection signal produced by the light sensor 8. In such a way, it may be possible to radiate the light rays with a desired intensity onto plants.

As is apparent from the foregoing description, according to the present invention, the ratio of direct light rays and indirect light rays can be selected optionally to a desired value for supplying both types of light rays to plants, and thereby the plants can be more and more effectively cultivated.

I claim:

1. A light ray radiating device for radiating light on a desired location comprising an optical conductor for conducting light rays, a first plate having means defining an opening, said optical conductor having a light-emitting end portion disposed in said opening, a frame means on which said first plate is supported, a second plate supported on said frame member at a position spaced from said first plate, said second plate comprising a liquid-crystal means selectiveably operable to transmit light rays therethrough and to reflect light rays therefrom, voltage control means for applying a voltage to said liquid-crystal means to selectively control the extent to which the light is transmitted through or reflected by said second plate, an intermediate plate adjustably mounted on said frame means for movement between said first and second plates, said intermediate plate having a central portion through which light rays are passable such that the adjusted position of said intermediate plate relative to said first and second plats determines the extent of direct light rays transmitted from said optical conductor to said second plate, whereby the light rays emitted from said light emitting end portion of said optical conductor are utilized for radiating said desired location and the extent of said light radiated as direct and indirect light is controlled by said voltage control means and by the adjusted position of said intermediate plate relative to said first and second plates.

2. A light ray radiating device according to claim 1, wherein said first plate has an upper side and a lower side, said lower side facing said intermediate plate, said lower side having a mirror surface for reflecting light rays.

3. A light ray radiating device according to claim 2, wherein said intermediate plate has a lower side and an upper side, said upper side of said intermediate plate facing said lower side of said first plate, said upper side of said intermediate plate having a mirror surface for reflecting light rays back to said lower side of said first plate.

4. A light ray radiating device according to claim 1, wherein said central portion of said intermediate plate comprises means defining a central opening through which light passes upon being transmitted from said light-emitting end portion of said optical conductor to said second plate.

5. A light ray radiating device according to claim 1, wherein said central portion of said intermediate plate comprises transparent means through which light passes upon being transmitted from said light-emitting end portion of said optical conductor to said second plate.

6. A light ray radiating device according to claim 1, wherein said first, second and intermediate plates are generally circular, said first, second and intermediate plates being generally axially aligned, said opening in said first plate being in the center of said first plate.

7. A light ray radiating device according to claim 6, wherein said first and second plates are mounted at fixed positions on said frame means, said intermediate plate being movable axially between said first and second plates.

8. A light ray radiating device according to claim 7, wherein said frame means comprises structural members made of a semi-transparent material.

9. A light ray radiating device according to claim 1, wherein said intermediate plate comprises a liquid-crystal means selectively operable to transmit light rays therethrough and to reflect light rays therefrom, and second voltage control means for applying a voltage to the last said liquid-crystal means to selectively control the extent to which the light is transmitted through or reflected by said intermediate plate.

10. A light ray radiating device according to claim 1 further comprising light-sensing means on said second plate for sensing the intensity of the light passing through said second plate, said light-sensing means being connected to said voltage control means such that the voltage control means controls said liquid-crystal means in response to said light-sensing means.

11. A light ray radiating device according to claim 10, wherein said second plate has an upper surface and a lower surface, said upper surface facing said intermediate plate, said light-sensing means being disposed on said lower surface of said second plate.

12. A light ray radiating device according to claim 1, wherein said liquid-crystal means comprises an upper transparent electrode plate, a lower transparent electrode plate, and diffusing and reflecting liquid crystal hermetically sealed between said upper and lower transparent electrode plates.

13. A light ray radiating device according to claim 12, wherein said voltage control means comprises a variable adjustable means for variably adjusting and controlling the amount of light transmitted through said second plate and the amount of light reflected by said second plate.

14. A light ray radiating device according to claim 2, wherein said intermediate plate has an annular portion disposed about said central portion, at least some of said indirect light rays passing from said optical conductor onto said annular portion and then reflected from said annular portion to said first plate and then again reflected from said first plate onto said desired location.

15. A light ray radiating device according to claim 14, wherein the light ray radiating device is juxtaposed to a light-useable means disposed at said desired location, said light ray radiating device being operable to transmit direct light rays and indirect light rays to said light-useable means, said direct light rays passing from said optical conductor through said central portion of said intermediate plate and through said second plate onto said light-useable means, at least some of said of said indirect light rays passing from said optical conductor through said central portion of said intermediate plate to said second plate and then reflected from said second plate to said intermediate plate and then again reflected from said intermediate plate onto said light-useable means.

16. A light ray radiating device for radiating light on a desired area comprising an optical conductor for conducting light rays, a first plate having means defining an opening, said optical conductor having a light-emitting end portion disposed in said opening, a frame means on which said first plate is supported, a second plate supported on said frame means at a position spaced from said first plate, said second plate comprising a liquid-crystal means selectiveably operable to transmit light rays therethrough and to reflect light rays therefrom, voltage control means for applying a voltage to said liquid-crystal means to selectively control the extent to which the light is transmitted through or reflected by said second plate, an intermediate plate adjustably mounted on said frame means for movement between said first and second plates, said intermediate plate having a central portion through which light rays are passable such that the adjusted position of said intermediate plate relative to said first and second plates determines the extent of direct light rays transmitted from said optical conductor to said second plate, said first plate having a mirror surface facing said intermediate plate, said intermediate plate having an annular portion disposed about said central portion, said annular portion having a first side facing said first plate and a second side facing said second plate, said first and second sides of said annular portion having reflecting surfaces, aid light ray radiating device being operable to transmit direct light rays and indirect light rays to said desired location, said direct light rays passing from said optical conductor through said central portion of said intermediate plate and through said second plate onto said desired area, at least some of said indirect light rays passing from said optical conductor through said central portion of said intermediate plate to said second plate and then reflected from said second plate to said second side of said intermediate plate and then again reflected from said second side of said intermediate plate to said desired area, at least some of said indirect light rays passing from said optical conductor onto said first side of said intermediate plate and then reflected from said first side of said intermediate plate to said mirror surface of said first plate and then reflected from said mirror surface of said first plate to said desired area, whereby the light rays emitted from said light-emitting end portion of said optical conductor are utilized for radiating said desired area and the extent of said light radiated as direct and indirect light is controlled by said voltage control means and by the adjusted position of said intermediate plate relative to said first and second plates.

* * * * *